United States Patent
Ukigaya et al.

(10) Patent No.: US 10,836,112 B2
(45) Date of Patent: Nov. 17, 2020

(54) LAMINATE OF ARAMID PAPER SHEET AND POLYIMIDE FILM AND METHOD FOR PRODUCING SAME

(71) Applicant: DUPONT TEIJIN ADVANCED PAPERS (JAPAN), LTD., Tokyo (JP)

(72) Inventors: Koichi Ukigaya, Tokyo (JP); Tatsushi Fujimori, Tokyo (JP); Shinji Naruse, Tokyo (JP); Chihiro Kondo, Tokyo (JP); Yasunori Tanaka, Tokyo (JP)

(73) Assignee: DUPONT TEIJIN ADVANCED PAPERS (JAPAN), LTD., Tokyo (JP)

( * ) Notice: Subject to any disclaimer, the term of this patent is extended or adjusted under 35 U.S.C. 154(b) by 159 days.

(21) Appl. No.: 16/083,084

(22) PCT Filed: Feb. 8, 2017

(86) PCT No.: PCT/JP2017/004588
§ 371 (c)(1),
(2) Date: Sep. 7, 2018

(87) PCT Pub. No.: WO2017/159131
PCT Pub. Date: Sep. 21, 2017

(65) Prior Publication Data
US 2019/0061270 A1    Feb. 28, 2019

(30) Foreign Application Priority Data

Mar. 16, 2016   (JP) ................. 2016-052555

(51) Int. Cl.
| | | |
|---|---|---|
| *B29C 65/00* | (2006.01) | |
| *B29C 65/02* | (2006.01) | |
| *B32B 27/34* | (2006.01) | |
| *D21H 27/30* | (2006.01) | |
| *D21H 25/04* | (2006.01) | |
| *B32B 37/06* | (2006.01) | |
| *D21H 13/26* | (2006.01) | |
| *B32B 37/00* | (2006.01) | |
| *B29C 65/18* | (2006.01) | |
| *B29C 65/44* | (2006.01) | |

(52) U.S. Cl.
CPC .............. *B29C 65/02* (2013.01); *B32B 27/34* (2013.01); *B32B 37/06* (2013.01); *D21H 13/26* (2013.01); *D21H 25/04* (2013.01); *D21H 27/30* (2013.01); *B29C 65/18* (2013.01); *B29C 65/44* (2013.01); *B29C 66/1122* (2013.01); *B29C 66/45* (2013.01); *B29C 66/71* (2013.01); *B29C 66/712* (2013.01); *B29C 66/73117* (2013.01); *B29C 66/73132* (2013.01); *B29C 66/73521* (2013.01); *B29C 66/83413* (2013.01); *B29C 66/919* (2013.01); *B29C 66/91421* (2013.01); *B29C 66/91941* (2013.01); *B29C 66/91943* (2013.01); *B29C 66/929* (2013.01); *B32B 37/0053* (2013.01); *B32B 2037/0092* (2013.01); *B32B 2250/03* (2013.01); *B32B 2250/24* (2013.01); *B32B 2307/206* (2013.01); *B32B 2307/306* (2013.01); *B32B 2309/02* (2013.01); *B32B 2309/12* (2013.01)

(58) Field of Classification Search
CPC ......... B29C 65/02; B29C 65/44; B32B 27/34; D21H 27/30
See application file for complete search history.

(56) References Cited

U.S. PATENT DOCUMENTS

| | | | | |
|---|---|---|---|---|
| 6,670,291 | B1 * | 12/2003 | Tompkins | ............... B32B 27/12 |
| | | | | 428/332 |
| 2004/0060655 | A1 | 4/2004 | Kawka et al. | |
| 2012/0128988 | A1 * | 5/2012 | Yokura | ..................... B32B 5/26 |
| | | | | 428/419 |
| 2014/0339582 | A1 * | 11/2014 | Matsumura | ........... H01L 33/505 |
| | | | | 257/98 |
| 2015/0111013 | A1 | 4/2015 | Fujimori et al. | |
| 2016/0214291 | A1 * | 7/2016 | Naruse | .................. H02K 15/10 |

FOREIGN PATENT DOCUMENTS

| | | |
|---|---|---|
| CN | 1694809 | 11/2005 |
| JP | 2013-223962 | 10/2013 |

OTHER PUBLICATIONS

International Search Report dated May 16, 2017 in International Application No. PCT/JP2017/004588.
Office Action dated Mar. 16, 2020 in corresponding Chinese Patent Application No. 201780017607.2 with English language translation.

* cited by examiner

*Primary Examiner* — Mark A Osele
*Assistant Examiner* — Nickolas R Harm
(74) *Attorney, Agent, or Firm* — Wenderoth, Lind & Ponack, L.L.P.

(57) ABSTRACT

Provided is a method for producing a laminate, comprising laminating an aramid paper sheet and a polyimide film together by performing heating and pressurizing process under conditions of a temperature of 275 to 320° C. and a pressure of 50 to 400 kgf/cm. In the present invention, an aramid paper sheet-polyimide film laminate with excellent heat resistance, electrical properties, chemical resistance, mechanical properties, and the like can be manufactured by laminating the aramid paper sheet and the polyimide film in a simple method without impairing their properties.

11 Claims, No Drawings

LAMINATE OF ARAMID PAPER SHEET AND POLYIMIDE FILM AND METHOD FOR PRODUCING SAME

TECHNICAL FIELD

The present invention relates to an aramid paper sheet-polyimide film laminate with excellent heat resistance, electrical properties (electrical insulation properties), chemical resistance, mechanical properties, and the like and a method for producing the same and particularly to an aramid paper sheet-polyimide film laminate useful as an insulating material of a rotary machine, a transformer, and electric and electronic devices and a method for producing the same.

BACKGROUND ART

In the field of electrical insulation where heat resistance is required, molded bodies made of heat resistant polymers have been conventionally used. Particularly, a molded product using an aromatic polyamide (hereafter, referred to as aramid) is a superb industrial material with heat resistance, chemical resistance, and a flame retardant property deriving from an aramid molecular structure. Among those, a paper sheet (trade name: Nomex paper (registered trademark)) made of fibrids and fibers of poly(meta-phenylene isophthalamide) is widely used as an electrical insulation paper sheet with excellent heat resistance.

Moreover, a laminate in which the aforementioned molded product and a sheet material such as a resin film with a different material quality are laminated together is similarly used widely in the electrical insulation application. In such a laminate, properties of sheet materials varying in material quality can be utilized as properties of the laminate by laminating the sheet materials together. For example, a material with higher heat resistance can be arranged on a surface layer of a laminate which comes into contact with a heat source to improve the heat resistance of the laminate as a whole.

Patent Document 1 discloses a method for laminating various types of resin sheets and aramid paper sheets together in which, in the lamination of sheet materials, bonding surfaces are plasma-treated. However, the plasma treatment requires a dedicated treatment apparatus and is not suitable for continuous treatment performed on a large sheet.

CITATION LIST

Patent Literature

Patent Literature 1: JP 2013-223962A

SUMMARY OF INVENTION

An object of the present invention is to provide an aramid paper sheet-polyimide film laminate with excellent heat resistance, electrical properties, chemical resistance, mechanical properties, and the like by laminating an aramid paper sheet and a polyimide film in a simple method without impairing their properties and a method for producing the same.

The present invention has been made based on the finding that the aforementioned problems can be solved by laminating the aramid paper sheet and the polyimide film together by performing a heating and pressurizing process at a certain temperature and a certain pressure. Specifically, the present invention includes the following aspects.

1. A method for producing a laminate, which comprises laminating an aramid paper sheet and a polyimide film together by performing a heating and pressurizing process under conditions of a temperature of 275 to 320° C. and a pressure of 50 to 400 kgf/cm.
2. The method for producing a laminate according to 1 described above, wherein the heating and pressurizing process is performed by using calender rolls.
3. The method for producing a laminate according to 1 or 2 described above, wherein a laminate having a three-layer structure of polyimide film-aramid paper sheet-polyimide film is formed by performing the heating and pressurizing process on a temporarily-laminated sheet in which one layer of the aramid paper sheet is sandwiched between two layers of the polyimide films.
4. The method for producing a laminate according to 1 or 2 described above, wherein a laminate having a two-layer structure of polyimide film-aramid paper sheet is formed by performing the heating and pressurizing process on a temporarily-laminated sheet in which one layer of the aramid paper sheet and one layer of the polyimide film are laminated together.
5. The method for producing a laminate according to any one of 1 to 4 described above, wherein the aramid paper sheet and the polyimide film are directly laminated together without an adhesion layer therebetween.
6. The method for producing a laminate according to any one of 1 to 5 described above, wherein bonding surfaces of the aramid paper sheet and the polyimide film are not plasma-treated before the heating and pressurizing process.
7. The method for producing a laminate according to any one of 1 to 6 described above, wherein a thickness of the aramid paper sheet is 20 to 1000 μm and a thickness of the polyimide film is 3 to 200 μm.
8. The method for producing a laminate according to any one of 1 to 7 described above, wherein a thickness of the laminate is 20 to 1500 μm.
9. A laminate formed by performing a heating and pressurizing process on an aramid paper sheet and a polyimide film under conditions of a temperature of 275 to 320° C. and a pressure of 50 to 400 kgf/cm.
10. The laminate according to 9 described above, wherein the laminate has a three-layer structure of polyimide film-aramid paper sheet-polyimide film.
11. The laminate according to 9 described above, wherein the laminate has a two-layer structure of polyimide film-aramid paper sheet.

Embodiments for Carrying out the Present Invention
(Aramid)

In the present invention, aramid means a linear polymer compound in which 60% or more of amide bonds are directly bonded to aromatic rings. Such aramids include a poly(meta-phenylene isophthalamide) and its copolymers, poly(para-phenylene terephthalamide) and its copolymers, co-poly(paraphenylene/3,4'-diphenylether terephthalamide), and the like.

These aramids are industrially manufactured by using methods such as a solution polymerization method, a two-step interfacial polymerization method, and the like utilizing, for example, a condensation reaction between an aromatic acid dichloride and an aromatic diamine, and are available as commercial products. However, the aramid is not limited to these. Among these aramids, poly(meta-phenylene isophthalamide) is preferable from the view point of having properties such as excellent moldability, flame retardant property, and heat resistance.

(Aramid Fibrids)

In the present invention, aramid fibrids are film-like fine particles made of an aramid and are also referred to as aramid pulp. Manufacturing methods are described in, for example, JP 35-11851B and JP 37-5732B and the like. The aramid fibrids have papermaking properties like normal wood pulp, and can be thus dispersed in water and then molded into a sheet by using a paper machine. In this case, a so-called beating treatment can be performed to provide quality suitable for papermaking. This beating treatment can be performed by a disc refiner, a beater, or any other papermaking raw material treatment machine which can perform a mechanical cutting action. In this operation, a form change of the fibrids can be monitored according to a freeness specified in JIS P8121.

In the present invention, the freeness of the aramid fibrids subjected to the beating treatment is preferably within a range of 10 to 300 cm$^3$ (Canadian Standard Freeness). Controlling the freeness to 300 cm$^3$ or less improves the strength of a sheet molded from the aramid fibrids. Setting the freeness to 10 cm$^3$ or more can improve utilization efficiency of inputted mechanical power and improve the processing amount per unit time. Moreover, appropriate fineness of the fibrids is achieved and a decrease in a binder function is suppressed.

(Aramid Staple Fibers)

In the present invention, aramid staple fibers are obtained by cutting fibers made of aramid in a predetermined length. Such fibers include "Nomex (registered trademark)" and "Kevlar (registered trademark)" manufactured by DuPont, "Conex (registered trademark)" and "Technora (registered trademark)" manufactured by Teijin Limited, and the like, but are not limited to these.

The aramid staple fibers can preferably have a fineness within a range of 0.05 dtex or more and less than 25 dtex. Fibers with a fineness of 0.05 dtex or more are less likely to aggregate in manufacturing in a wet method (to be described later). Moreover, fibers with a fineness less than 25 dtex have an appropriate fiber diameter. For example, assuming that the density of the fibers with a true circular shape is 1.4 g/cm, if the diameter is 45 micron or more, there are risks of a decrease in an aspect ratio, a decrease in a mechanical reinforcement effect, and a failure in evenness of an aramid paper sheet.

The length of the aramid staple fibers is preferably selected within a range of 1 mm or more and less than 25 mm. When the length of the staple fibers is 1 mm or more, the aramid paper sheet has sufficient mechanical properties. When the length is less than 25 mm, it is possible to suppress occurrence of "tangling" and "bundling" in the manufacturing of the aramid paper sheet in the wet method to be described later.

(Aramid Paper)

In the present invention, the aramid paper sheet is a sheet formed mainly of the aforementioned aramid fibrids and aramid staple fibers and generally has a thickness of 20 μm to 1000 μm, preferably a thickness of 70 μm to 800 μm, more preferably a thickness of 300 μm to 600 μm.

Moreover, the aramid paper sheet generally has a basis weight of 10 g/m$^2$ to 1000 g/m$^2$, preferably a basis weight of 30 g/m$^2$ to 400 g/m$^2$, more preferably a basis weight of 50 g/m$^2$ to 200 g/m$^2$, even more preferably a basis weight of 80 g/m$^2$ to 180 g/m$^2$. Here, although the aramid fibrids and the aramid staple fibers can be mixed at any ratio, the ratio (mass ratio) of aramid fibrids/aramid staple fibers is preferably 1/9 to 9/1, more preferably 2/8 to 8/2 but is not limited to these ranges.

The glass transition temperature of the aramid paper sheet is not limited to a particular temperature but is generally, 255 to 275° C., preferably 260 to 270° C.

In this application, the glass transition temperature is obtained as follows: a test piece is heated from the room temperature at a rate of 3° C. per minute and a heat generation amount is measured by using a differential scanning calorimeter; two extended lines are drawn on a heat absorption curve; and a value obtained from an intersection of the heat absorption curve with a ½straight line between the extended lines is set as the glass transition temperature. The differential scanning calorimeter can be used as a device for measuring the glass transition temperature.

The aramid paper sheet is generally manufactured by using a method in which the aforementioned aramid fibrids and aramid staple fibers are mixed and then formed into a sheet. Specifically, it is possible to employ methods such as, for example, a method that includes: subjecting the aforementioned aramid fibrids and aramid staple fibers to dry blending; and then forming a sheet by utilizing an air flow and a method that includes: dispersing and mixing the aramid fibrids and the aramid staple fibers in a liquid medium; then discharging the aramid fibrids and the aramid staple fibers onto a liquid permeable supporting body such as a mesh or a belt to form a sheet; and drying the sheet by removing the liquid. Among these methods, a so-called wet papermaking method which uses water as a medium is preferably selected.

As a general wet papermaking method, there is a method for delivering an aqueous slurry of a single substance or a mixture containing at least the aramid fibrids and the aramid staple fibers to a paper machine to disperse the slurry and then dehydrating, squeezing, and drying the slurry to take up the resultant matter as a sheet. As the paper machine, there is utilized a Fourdrinier paper machine, a cylinder paper machine, an inclined-type paper machine, a combination paper machine obtained by combining any of the aforementioned paper machines, or the like. In manufacturing using the combination paper machine, a composite sheet made of multiple paper layers can be obtained by molding slurries varying in the blend ratio into sheets and unifying the sheets. Additives such as a dispersion improving agent, a defoamer, and a paper strength improving agent are used in the papermaking as necessary.

(Calendar Processing)

The density and mechanical strength of the aramid paper sheet obtained as described above can be improved by performing a heating and pressurizing process on the aramid paper sheet between a pair of rollers at a high temperature and a high pressure. For example, when metal rollers are used, conditions of the heating and pressurizing process can include a temperature of 275 to 320° C. and a linear pressure of 50 to 400 kg/cm but are not limited to these. Multiple aramid paper sheets can be laminated together in heat pressing.

(Polyimide Film)

Since a polyimide film has excellent mechanical, electrical, and chemical properties in a wide temperature range from a very-low temperature region to a high temperature region, the polyimide film is widely utilized as an electrical insulating material and a stiffener of a flexible circuit board used to mount parts. The thickness of the polyimide film is generally 3 μm to 200 μm, preferably 5 μm to 150 μm, more preferably 10 μm to 25 μm. Such polyimide films include Kapton (registered trademark) manufactured by DuPont-Toray Co., Ltd. but are not limited to this.

Moreover, the polyimide film preferably has a basis weight of 3 g/m² to 300 g/m², more preferably a basis weight of 4 g/m² to 150 g/m², even more preferably a basis weight of 5 g/m² to 50 g/m².

(Aramid Paper-Polyimide Film Laminate)

An aramid paper sheet-polyimide film laminate is manufactured by performing the heating and pressurizing process on the aforementioned aramid paper sheet and polyimide film. The aramid paper sheet-polyimide film laminate is a laminate obtained by laminating the aramid paper sheet and the polyimide film together to form a layered structure including at least two layers. The thickness of the laminate is preferably 20 μm to 1500 μm, more preferably 50 μm to 800 μm, even more preferably 200 μm to 400 μm but is not limited to a particular thickness. The thickness is selected depending on the application.

Moreover, the aramid paper sheet-polyimide film laminate has preferably a basis weight of 10 g/m² to 2000 g/m², more preferably a basis weight of 30 g/m² to 700 g/m², even more preferably a basis weight of 80 g/m² to 400 g/m².

The sizes of the aramid paper sheet and the polyimide film are not limited to particular sizes. The sizes to be used may be determined in consideration of various factors such as the application of the laminate, the production cost, and existing facilities. From the view point of productivity, a roll of aramid paper and a roll of polyimide film are prepared and the laminate is manufactured by performing continuous heating and pressurizing process. In manufacturing of a prototype or a custom order item, the manufacturing can be made simpler by using the aramid paper sheet and the polyimide film of small sizes.

The heating and pressurizing process refers to processing of applying both of heat and pressure to the laminate. Although an apparatus which performs the heating and pressurizing process is not limited to a particular apparatus, a calender apparatus is used in one embodiment. The calender apparatus is widely used in the industry field and is an apparatus which is formed by combing several calender rolls and which applies compression force to a sheet target by passing the target between the rolls. Passing the target between the calender rolls can increase the density of the target and improve the smoothness of the target. Rolls having an appropriate size and made of an appropriate material such as steel rolls and elastic rolls are selected depending on the conditions of the pressure and temperature to be applied to the target. The configuration of the calender rolls is not limited to a particular configuration. A laminate in which different materials are laminated together can be manufactured by passing multiple sheet targets between the calender rolls. An appropriate calender apparatus is selected depending on the dimensions of sheets to be laminated. For example, when the aramid paper sheet and the polyimide film to be laid one on top of the other have long lengths and are in a rolled form, a calender apparatus with a paper sending function for two or more rolls may be used.

In one embodiment, the aramid paper sheet and the polyimide film are directly laminated to each other without an adhesion layer therebetween. In this mode, it is possible reduce the manufacturing cost and improve productivity. In the present invention, a laminate with a sufficient bonding property can be manufactured without the adhesion layer.

In one embodiment, bonding surfaces of the aramid paper sheet and the polyimide film are not plasma-treated before the heating and pressurizing process. Although the bonding property can be improved by plasma-treating the bonding surfaces, in the present invention, a laminate with a sufficient bonding property can be manufactured without the plasma treatment. Employing a process of manufacturing the laminate without the plasma treatment can reduce manufacturing cost and improve productivity.

The temperature in the heating and pressurizing process is set to at least the glass transition temperature of the aramid paper sheet forming the laminate. Note that, when two or more aramid paper sheets are to be laminated, the glass transition temperature in the present invention is defined to be the glass transition temperature of the aramid paper sheet in contact with the polyimide film. When the heating and pressurizing process is performed by using the calender rolls, the temperature of the calender rolls is set to at least the glass transition temperature of the aramid paper sheet forming the laminate.

In the present invention, a temperature range of 275 to 320° C. needs to be employed as the temperature in the heating and pressurizing process. This temperature is preferably 280 to 315° C., more preferably 285 to 310° C. The temperature in the heating and pressurizing process can be generally adjusted by using a control mechanism of a used apparatus. For example, the temperature of a heat and pressure application device such as the calender rolls can be controlled as a set temperature of the calender rolls.

In the present invention, in addition to the aforementioned specific temperature, a pressure range of 50 to 400 kgf/cm needs to be employed as the pressure in the heating and pressurizing process. This pressure is preferably 75 to 350 kgf/cm, more preferably 100 to 350 kgf/cm, even more preferably, 150 to 330 kgf/cm. The pressure in the heating and pressurizing process can be generally adjusted by using the control mechanism of the used apparatus. For example, the pressure of the heat and pressure application device such as the calender rolls can be generally controlled by using the control mechanism of the apparatus.

In the present invention, when the laminate of the aramid paper sheet and the polyimide film is formed by the heating and pressurizing process, the density of the aforementioned aramid paper sheet can be increased at the same time. Accordingly, in some cases, a calender treatment in manufacturing of the aramid paper sheet can be simplified or omitted. In this case, process efficiency can be further improved.

In one embodiment, the laminate is a laminate having a three-layer structure of polyimide film-aramid paper sheet-polyimide film. Such a laminate is manufactured by forming a temporarily-laminated sheet in which one layer of aramid paper sheet is sandwiched between two layers of polyimide films and performing the heating and pressurizing process on the temporarily-laminated sheet.

Advantages of the laminate in which the aramid paper sheet is sandwiched between the polyimide films include uniformness in the thickness direction and dimensional stability. Moreover, since the polyimide films with high heat resistance are arranged on both sides, a laminate with high heat resistance is obtained. Applications utilizing such properties include a heat resistant spacer in which both sheet surfaces come into contact with high temperature portions and a stiffener of a flexible circuit board which requires heat resistance for solder.

In another embodiment, the laminate is a laminate having a two-layer structure of polyimide film-aramid paper sheet. Such a laminate is manufactured by forming a temporarily-laminated sheet in which one layer of aramid paper sheet and one layer of polyimide film are laminated together and performing the heating and pressurizing process on the temporarily-laminated sheet.

In the laminate in which one layer of aramid paper sheet and one layer of polyimide film are laminated together, the aramid paper sheet is exposed on one surface and the polyimide film is exposed on the other surface. Advantages of such a laminate include a point that a high insulating property of the polyimide film is imparted to the aramid paper sheet. For example, the laminate is preferably used in an insulation application where a sufficient insulating property cannot be obtained only by using the aramid paper sheet.

EXAMPLES

The present invention is described below more specifically based on Examples. The following Examples are merely exemplifications and do not limit the contents of the present invention at all.

Example 1

(Raw Material Preparation)

Fibrids of poly(meta-phenylene isophthalamide) were manufactured by using a pulp particle manufacturing device (wet precipitation apparatus) described in JP 52-15621A and formed by combing a stator and a rotor. The fibrids were treated in a disintegrator and a beater to prepare fibrids with a weighted average fiber length of 0.9 mm. Meanwhile, meta-aramid fibers (Nomex (registered trademark, single-yarn fineness 2.2 dtex) manufactured by DuPont were cut into length of 6 mm to be used as a raw material for papermaking.

(Manufacturing of Aramid Paper)

The aramid fibrids and the aramid staple fibers prepared as described above were independently dispersed into water to produce slurries. These slurries were mixed with the mix ratio (weight ratio) of the aramid fibrids and the aramid staple fibers being 1/1. Then, the mixture was sent to a Fourdrinier paper machine to be dehydrated, squeezed, dried, and taken up and the aramid paper sheet was obtained.

(Manufacturing of Aramid Paper-Polyimide Film Laminate)

The aramid paper sheet ("Nomex (registered trademark) paper type 411" manufactured by DuPont Teijin Advanced Papers (Japan), Ltd., nominal thickness 15 mil, glass transition temperature 275° C.) manufactured by the aforementioned method and a polyimide film ("Kapton (registered trademark) 50H" manufactured by DuPont-Toray Co., Ltd., glass transition temperature=300° C.) were each cut in A4 size and laid one on top of other to prepare a temporary laminate. A calender apparatus including metal calender rolls performed the heating and pressurizing process on this temporary laminate in a temperature setting of 300° C. and a linear pressure setting of 300 kgf/cm and a two-layer laminate of aramid paper sheet-polyimide film was obtained.

Main properties of the laminate obtained as described above were evaluated in the following methods. The results thereof are described in Table 1.

[Measurement Method]

(1) Basis Weight, Thickness, Density

Measurement according to JIS C 2323-2 was performed and the density was calculated from (basis weight/thickness).

(2) Exterior

An exterior of a laminate was observed and a laminate with a smooth and uniform surface was determined to be "good" and a laminate in which air bubbles were formed or significant unevenness was observable was determined to be "not good."

(3) Bonding Property

A laminate in which the aramid paper sheet and the polyimide film were bonded together was determined to be "good" and a laminate in which the aramid paper sheet and the polyimide film were not bonded together was determined to be "not good."

Example 2

The aramid paper sheet and two of the polyimide films obtained in Example 1 were each cut in A4 size and were laid one on top of another such that the aramid paper sheet was sandwiched between the two polyimide films to prepare a temporary laminate. The calender apparatus including the metal calender rolls performed the heating and pressurizing process on this temporary laminate in the temperature setting of 300° C. and the linear pressure setting of 300 kgf/cm and a three-layer laminate of polyimide film-aramid paper sheet-polyimide film was obtained. Main property values of the thus-obtained insulating member were evaluated as in Example 1. The results thereof are described in Table 1.

Comparative Example 1

The aramid paper sheet and the polyimide film obtained in Example 1 were each cut in A4 size and laid one on top of the other to prepare a temporary laminate. The calender apparatus including the metal calender rolls performed the heating and pressurizing process on this temporary laminate in a temperature setting of 250° C. and the linear pressure setting of 300 kgf/cm and a two-layer laminate of aramid paper sheet-polyimide film was obtained. Main property values of the thus-obtained insulating member were evaluated as in Example 1. The results thereof are described in Table 1.

Comparative Example 2

The aramid paper sheet and the polyimide film obtained in Example 1 were each cut in A4 size and laid one on top of the other to prepare a temporary laminate. The calender apparatus including the metal calender rolls performed the heating and pressurizing process on this temporary laminate in a temperature setting of 330° C. and the linear pressure setting of 300 kgf/cm and a two-layer laminate of aramid paper sheet-polyimide film was obtained. Main property values of the thus-obtained insulating member were evaluated as in Example 1. The results thereof are described in Table 1.

TABLE 1

| Product | Property | Unit | Example 1 | Example 2 | Comparative Example 1 | Comparative Example 2 |
| --- | --- | --- | --- | --- | --- | --- |
| Aramid paper | Basis weight | g/m$^2$ | 130 | 130 | 130 | 130 |
| | Thickness | mm | 0.443 | 0.443 | 0.443 | 0.443 |
| | Density | g/cm$^3$ | 0.29 | 0.29 | 0.29 | 0.29 |
| | Glass transition temperature | °C. | 275 | 275 | 275 | 275 |

TABLE 1-continued

| Product | Property | Unit | Example 1 | Example 2 | Comparative Example 1 | Comparative Example 2 |
|---|---|---|---|---|---|---|
| Polyimide film | Basis weight | g/m² | 18 | 18 | 18 | 18 |
| | Thickness | mm | 0.013 | 0.013 | 0.013 | 0.013 |
| | Density | g/cm³ | 1.38 | 1.38 | 1.38 | 1.38 |
| Aramid paper-polyimide film laminate | Heating temperature | °C. | 300 | 300 | 250 | 330 |
| | Applied pressure | kgf/cm | 300 | 300 | 300 | 300 |
| | Number of Layers | — | Two layers (Aramid-polyimide) | Three layers (Polyimide-Aramid-polyimide) | Two layers (Aramid-polyimide) | Two layers (Aramid-polyimide) |
| | Basis weight | g/m² | 148 | 166 | 148 | 148 |
| | Thickness | mm | 0.249 | 0.263 | 0.265 | 0.275 |
| | Density | g/cm³ | 0.59 | 0.63 | 0.56 | 0.54 |
| | Exterior | — | Good | Good | Not good | Not good |
| | Bonding Property | — | Good | Good | Not good | Not good |

As illustrated in Table 1, it is found that an aramid paper sheet-polyimide film laminate with both of an excellent bonding property and an excellent exterior can be obtained by selecting an appropriate temperature which is the glass transition temperature of the aramid paper sheet or higher, in the heating and pressurizing process. Moreover, when the temperature in the heating and pressurizing process was 250° C. or lower, generation of air bubbles caused by moisture contained in the aramid paper sheet was confirmed. Furthermore, when the temperature in the heating and pressurizing process was 330° C. or higher, bonding wrinkles due to a difference in thermal shrinkage ratio between the aramid paper sheet and the polyimide film was confirmed and the bonding between the aramid paper sheet and the polyimide film was insufficient.

From the aforementioned results, it is found that an aramid paper sheet-polyimide film laminate obtained by being subject to the heating and pressurizing process at a temperature of at least 275° C., being the glass transition temperature of the aramid paper sheet, and at most 320° C., being a temperature at which no excessive heat shrinkage of the aramid paper sheet occurs, as described in Examples 1 and 2 can be effectively used as an aramid paper sheet-polyimide film laminate which has excellent heat resistance, electrical properties, mechanical properties, and the like and which is useful as an electrical insulation material and a stiffener of a flexible circuit board.

What is claimed is:

1. A method for producing a laminate, which comprises laminating an aramid paper sheet and a polyimide film together by performing a heating and pressurizing process under conditions of a temperature of 275 to 320° C. and a pressure of 50 to 400 kgf/cm.

2. The method for producing a laminate according to claim 1, wherein the heating and pressurizing process is performed by using calender rolls.

3. The method for producing a laminate according to claim 1, wherein a laminate having a three-layer structure of polyimide film-aramid paper sheet-polyimide film is formed by performing the heating and pressurizing process on a temporarily-laminated sheet in which one layer of the aramid paper sheet is sandwiched between two layers of the polyimide films.

4. The method for producing a laminate according to claim 1, wherein a laminate having a two-layer structure of polyimide film-aramid paper sheet is formed by performing the heating and pressurizing process on a temporarily-laminated sheet in which one layer of the aramid paper sheet and one layer of the polyimide film are laminated together.

5. The method for producing a laminate according to claim 1, wherein the aramid paper sheet and the polyimide film are directly laminated together without an adhesion layer therebetween.

6. The method for producing a laminate according to claim 1, wherein bonding surfaces of the aramid paper sheet and the polyimide film are not plasma-treated before the heating and pressurizing process.

7. The method for producing a laminate according to claim 1, wherein a thickness of the aramid paper sheet is 20 to 1000 μm and a thickness of the polyimide film is 3 to 200 μm.

8. The method for producing a laminate according to claim 1, wherein a thickness of the laminate is 20 to 1500 μm.

9. A laminate formed by performing a heating and pressurizing process on an aramid paper sheet and a polyimide film under conditions of a temperature of 275 to 320° C. and a pressure of 50 to 400 kgf/cm.

10. The laminate according to claim 9, wherein the laminate has a three-layer structure of polyimide film-aramid paper sheet-polyimide film.

11. The laminate according to claim 9, wherein the laminate has a two-layer structure of polyimide film-aramid paper sheet.

* * * * *